(12) United States Patent
Imamura

(10) Patent No.: US 7,254,045 B2
(45) Date of Patent: Aug. 7, 2007

(54) POWER SUPPLY CIRCUIT AND ELECTRONIC EQUIPMENT

(75) Inventor: Noritoshi Imamura, Miyagi (JP)

(73) Assignee: Sony Corporation (JP)

( * ) Notice: Subject to any disclaimer, the term of this patent is extended or adjusted under 35 U.S.C. 154(b) by 182 days.

(21) Appl. No.: 10/504,865

(22) PCT Filed: Dec. 24, 2003

(86) PCT No.: PCT/JP03/16619

§ 371 (c)(1),
(2), (4) Date: Apr. 25, 2005

(87) PCT Pub. No.: WO2004/059823

PCT Pub. Date: Jul. 15, 2004

(65) Prior Publication Data

US 2005/0243492 A1    Nov. 3, 2005

(30) Foreign Application Priority Data

Dec. 26, 2002   (JP) .............................. 2002-378505

(51) Int. Cl.
*H02M 3/335* (2006.01)
(52) U.S. Cl. ............... 363/21.1; 363/21.08; 363/21.16; 363/20
(58) Field of Classification Search .............. 363/21, 363/39, 40, 41, 51, 52, 15, 21.12, 21.11, 21.1, 363/21.08, 21.04, 26, 35, 44, 80, 81, 82, 363/84, 89, 100, 101, 110, 126, 143, 145, 363/21.01, 21.02, 21.03, 21.05, 21.06, 21.07, 363/21.09, 21.13, 21.14, 21.15, 21.16, 21.17, 363/21.18

See application file for complete search history.

(56) References Cited

U.S. PATENT DOCUMENTS 6,147,882 A * 11/2000 Huber et al. .................. 363/39

(Continued)

FOREIGN PATENT DOCUMENTS

| JP | 07-170743 | 7/1995 |
| JP | 7-170743 A | 7/1995 |
| JP | 9-154278 | 6/1997 |

(Continued)

OTHER PUBLICATIONS

International Search Report dated Apr. 13, 2004.

*Primary Examiner*—Lisa Caputo
*Assistant Examiner*—Stuart Hansen
(74) *Attorney, Agent, or Firm*—Rader Fishman & Grauer PLLC; Ronald P. Kananen

(57) ABSTRACT

A power factor is improved using a simplified structure without particularly providing a power factor improving circuit, and high efficiency is obtained. For this purpose, one terminal of a direct-current power source 12, from which a pulsating current is obtained, is connected through a choke coil 13 to one end of an auxiliary coil 14c constituting a converter transformer 14; the other end of the auxiliary coil 14c is connected to the other terminal of the direct-current power source 12 through a series circuit of a diode 15 and a capacitor 16; a connection midpoint between the diode 15 and the capacitor 16 is connected to one end of a primary coil 14a of the converter transformer 14; the other end of the primary coil 14a is connected to the other terminal of the direct-current power source 12 through a switching element 17; a secondary coil 14b of the converter transformer 14 is connected to direct-current voltage output terminals 19a and 19b through a rectifying circuit 18; the direct-current voltage output terminal 19a is connected to an input side of a pulse width modulation control circuit 20; and an output terminal of the pulse width modulation control circuit 20 is connected to a control electrode of the switching element 17.

2 Claims, 5 Drawing Sheets

U.S. PATENT DOCUMENTS

| | | | |
|---|---|---|---|
| 6,731,521 B2 * | 5/2004 | Yasumura | 363/21.03 |
| 6,980,446 B2 * | 12/2005 | Simada et al. | 363/49 |
| 2003/0002301 A1 * | 1/2003 | Yamagishi et al. | 363/21.12 |
| 2005/0270809 A1 * | 12/2005 | Koch | 363/21.08 |

FOREIGN PATENT DOCUMENTS

| | | |
|---|---|---|
| JP | 9-154278 A | 6/1997 |
| JP | 10-004684 * | 1/1998 |
| JP | 10-4684 A | 1/1998 |
| JP | 10-341571 | 12/1998 |
| JP | 10-341571 A | 12/1998 |
| JP | 11-332220 | 11/1999 |
| JP | 2002-034250 | 1/2002 |
| JP | 2002-34250 A | 1/2002 |
| JP | 2002-315327 | 10/2002 |
| JP | 2002-315327 A | 10/2002 |

* cited by examiner

US 7,254,045 B2

POWER SUPPLY CIRCUIT AND ELECTRONIC EQUIPMENT

TECHNICAL FIELD

The present invention relates to a power supply circuit capable of supplying comparatively large electric power and electronic equipment which uses comparatively large electric power.

BACKGROUND ART

Conventionally, as a power supply circuit of a switching type capable of supplying comparatively large electric power of, for example, 70 W, one shown in FIG. 7 has been proposed. The power supply circuit shown in FIG. 7 is the one to which a power factor improving circuit is added to comply with a harmonics regulation.

In FIG. 7, a reference numeral 1 denotes, for example, a commercial power supply of 100v, 50 Hz, and one terminal and the other terminal of the commercial power supply 1 are respectively connected to one terminal and the other terminal on the input side of a rectifying circuit 3 having a bridge structure of diodes through a high frequency blocking filter 2.

A pulsating current in the positive direction corresponding to a frequency of the commercial power supply 1 is obtained at a positive electrode terminal and a negative electrode terminal on the output side of the rectifying circuit 3. The positive electrode terminal of the output side of the rectifying circuit 3 is connected to one end of a primary coil 5a of a converter transformer 5 through a series circuit of a choke coil 4a and a diode 4b constituting a power factor improving circuit 4; the other end of the primary coil 5a is connected to a drain of a field effect transistor 6 constituting a switching element; and a source of the field effect transistor 6 is connected to the negative electrode terminal on the output side of the rectifying circuit 3.

A connection midpoint between the choke coil 4a and the diode 4b is connected to a drain of a field effect transistor 4c constituting the power factor improving circuit 4; a source of the field effect transistor 4c is connected to the negative electrode terminal of the rectifying circuit 3; and a switching signal from a control circuit 4d is supplied to a gate of the field effect transistor 4c. In addition, a connection midpoint between the diode 4b and the one end of the primary coil 5a is connected to the negative electrode terminal of the rectifying circuit 3 through a capacitor 4e constituting the power factor improving circuit 4.

In the power factor improving circuit 4, the pulsating current obtained at the output side of the rectifying circuit 3 is made into the form of a sine wave to be supplied to the primary coil 5a of the converter transformer 5.

Further, one end of a secondary coil 5b having a winding of a reverse phase to the primary coil 5a of the converter transformer 5 is connected to a direct-current voltage output terminal 8a of one end through a diode 7a constituting a rectifying circuit 7; a connection midpoint between the diode 7a and the direct-current voltage output terminal 8a of one end is connected to the other end of the secondary coil 5b through a smoothing capacitor 7b constituting the rectifying circuit 7; and the other end of the secondary coil 5b is connected to the direct-current voltage output terminal 8b of the other end.

The direct-current voltage output terminal 8a of one end is connected to the input side of a pulse width modulation control circuit 9 consisting of a semiconductor integrated circuit; a switching signal of a pulse width modulation signal obtained on the output side of the pulse width modulation control circuit 9 is supplied to a gate of the field effect transistor 6; and switching of the field effect transistor 6 is performed using the switching signal of the pulse width modulation signal, so that a constant direct-current voltage $V_O$ can be obtained on both the one side and the other side of the direct-current voltage output terminals 8a and 8b.

In such power supply circuit as shown in FIG. 7, an input pulsating current from the rectifying circuit 3 is controlled by the power factor improving circuit 4 to be the form of a sine wave, thereby improving a power factor.

As to the power factor in the above case, when an input electric power is |W|; an input electric current is |A|; and an input electric voltage is |V|, then the power factor cos" is expressed:

$$\cos" = |W|/(|A| \times |V|)$$

When the power factor improving circuit 4 is provided as shown in FIG. 7, the power factor cos" can be improved up to 0.8 to 0.99 and an input current waveform is approximated to an input voltage waveform.

DISCLOSURE OF THE INVENTION

However, when the above power factor improving circuit 4 is provided with a conventional power supply circuit of a switching type, efficiency of the power factor improving circuit 4 is integrated with efficiency of the power supply circuit and therefore, the efficiency of the power supply circuit is lowered. For example, if the efficiency of a conventional power supply circuit of a switching type is 90% and the efficiency of the power factor improving circuit 4 is 90%, the whole efficiency becomes 81%.

Moreover, since the power factor improving circuit 4 performs switching of a large electric current by using the field effect transistor 4c, there is a disadvantage of the power factor improving circuit 4 becoming a source which generates noise.

Further, when the power factor improving circuit 4 is provided, a circuitry becomes complicated with the power factor improving circuit 4 and a space for accommodation thereof must be required, which leads to a disadvantage of the power supply circuit being more expensive.

In view of the above, the present invention aims to improve a power factor using a simplified structure without particularly providing a power factor improving circuit and also to obtain high efficiency.

A power supply circuit according to the present invention is the one in which one terminal of a direct-current power source capable of obtaining a pulsating current is connected through a choke coil to one end of an auxiliary coil constituting a converter transformer; the other end of the auxiliary coil is connected to the other terminal of the direct-current power source through a series circuit of a diode and a capacitor; a connection midpoint between the diode and the capacitor is connected to one end of an primary coil of the converter transformer; the other end of the primary coil is connected to the other terminal of the direct-current power source through a switching element; a secondary coil of the converter transformer is connected to a direct-current voltage output terminal through a rectifying circuit; the direct-current voltage output terminal is connected to the input side of a pulse width modulation control circuit; and an output terminal of the pulse width modulation control circuit is connected to an control electrode of the switching element.

According to the present invention, an input pulsating current flows when the diode is positively biased by a difference between a voltage of the auxiliary coil of the converter transformer, and a counter-electromotive voltage of the choke coil and an input voltage; and a waveform thereof corresponds to an input voltage of the pulsating current and a conduction angle is enlarged to becomes a form of a sine wave, so that an improvement of a power factor can be made automatically.

Further, according to the present invention, since there is no structure which brings the efficiency down, it is possible to obtain a power supply circuit of a switching type which has high efficiency.

BEST MODE FOR CARRYING OUT THE INVENTION

Hereinafter, an embodiment of a power supply circuit according to the present invention is explained referring to accompanied drawings.

Figure 1:
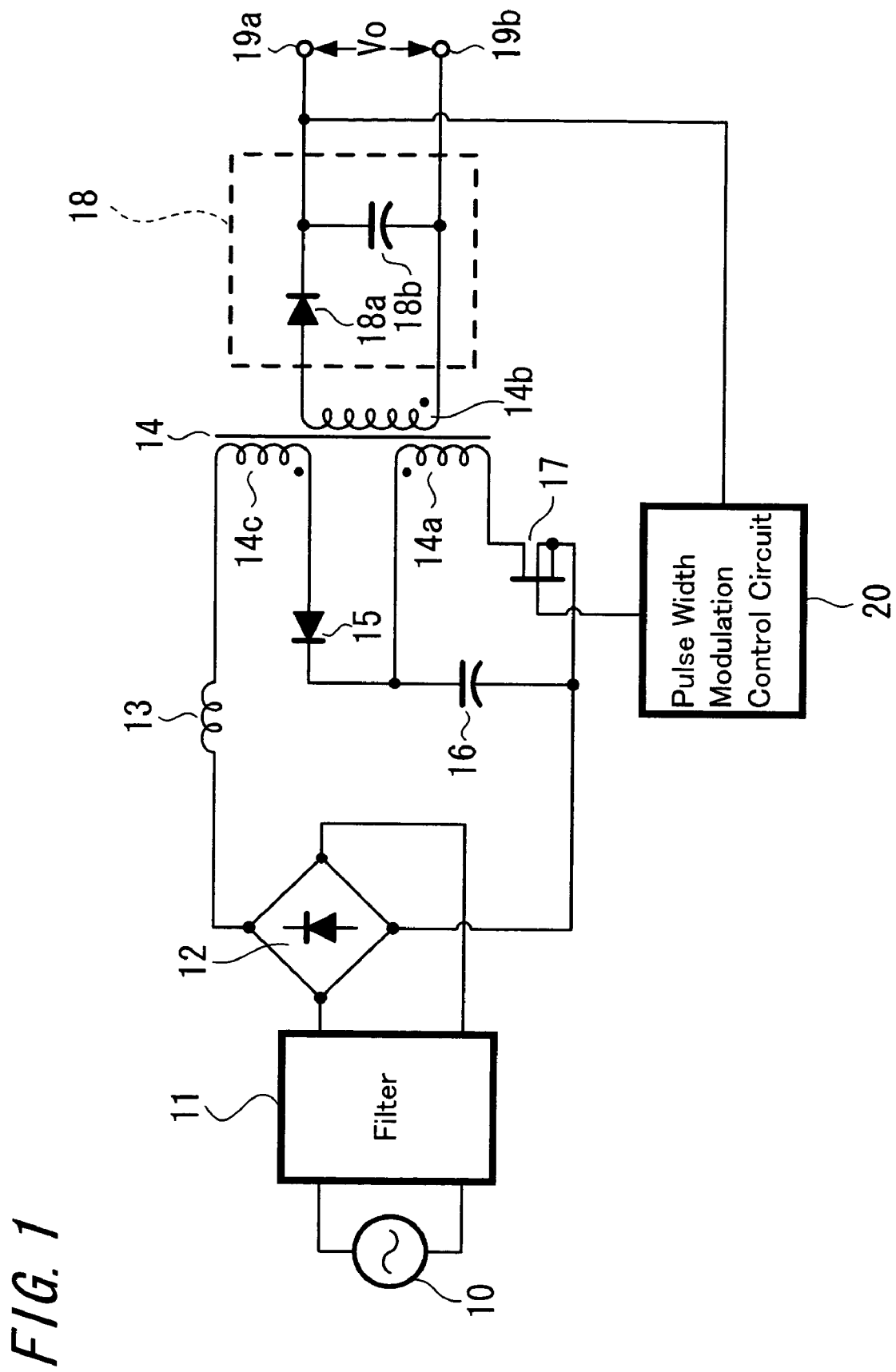
FIG. 1 is a constitutional diagram showing an embodiment of a power supply circuit according to the present invention.

FIG. 1 shows a power supply circuit according to this embodiment, in which a reference numeral 10 denotes a commercial power supply of, for example, 100v, 50 Hz; and one terminal and the other terminal of the commercial power supply 10 are respectively connected through a high frequency blocking filter 11 to one terminal and the other terminal on the input side of a rectifying circuit 12 having a bridge structure of diodes.

A pulsating current in a positive direction corresponding to a frequency of the commercial power supply 10 can be obtained at a positive electrode terminal and a negative electrode terminal on the output side of the rectifying circuit 12. The positive electrode terminal on the output side of the rectifying circuit 12 is connected through a choke coil 13 to one end of an auxiliary coil 14c having a winding of a reverse phase to a primary coil 14a constituting a converter transformer 14; the other end of the auxiliary coil 14c is connected to an anode of a diode 15; a cathode of the diode 15 is connected to a positive electrode of an electrolytic capacitor 16; and a negative electrode of the electrolytic capacitor 16 is connected to the negative electrode terminal on the output side of the rectifying circuit 12.

A connection midpoint between the cathode of the diode 15 and the positive electrode of the electrolytic capacitor 16 is connected to one end of the primary coil 14a of the converter transformer 14; the other end of the primary coil 14a is connected to a drain of a field effect transistor 17 constituting a switching element; and a source of the field effect transistor 17 is connected to the negative electrode terminal of the rectifying circuit 12.

Further, one end of a secondary coil 14b having a winding of a reverse phase to the primary coil 14a of the converter transformer 14 is connected to an anode of a diode 18a constituting a rectifying circuit 18; a cathode of the diode 18a is connected to a direct-current voltage output terminal 19a of one end; a connection midpoint between the diode 18a and the direct-current voltage output terminal 19a of one end is connected to the other end of the secondary coil 14b through a smoothing capacitor 18b constituting the rectifying circuit 18; and the other end of the secondary coil 14b is connected to a direct-current voltage output terminal 19b of the other end.

The direct-current voltage output terminal 19a of one end is connected to the input side of a pulse width modulation control circuit 20 consisting of a semiconductor integrated circuit; a switching signal of a pulse width modulation signal corresponding to an output direct-current voltage $V_0$ obtained on the output side of the pulse width modulation control circuit 20 is supplied to a gate of the field effect transistor 17; and switching is performed on the field effect transistor 17 using the switching signal of the pulse width modulation signal, so that the constant direct-current voltage $V_0$ is obtained at both the one side and the other side of the direct-current voltage output terminals 19a and 19b.

Figure 2:
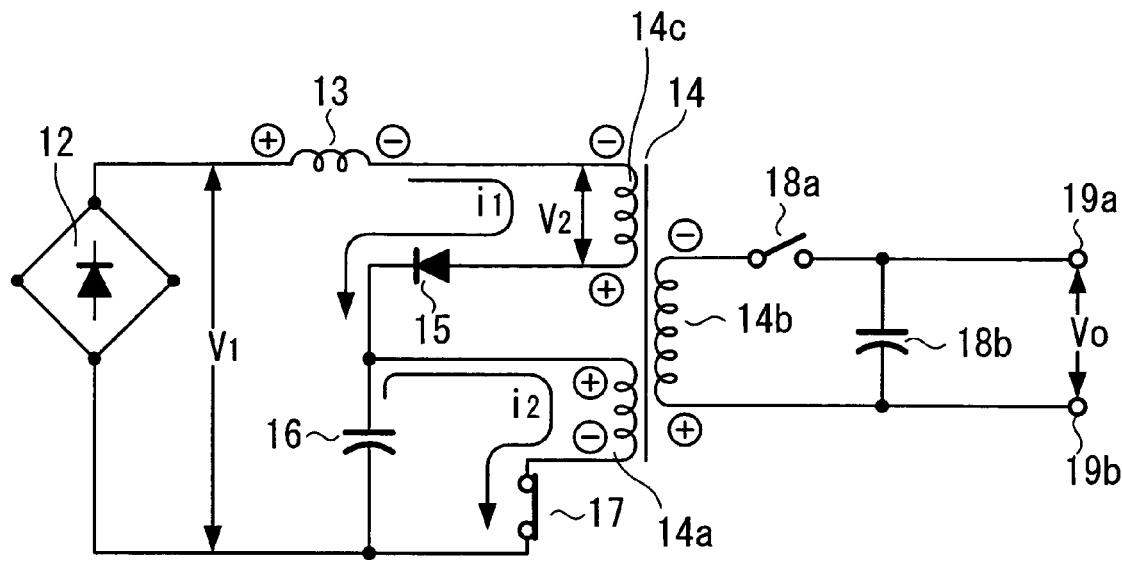
FIG. 2 is a circuit diagram provided for explaining FIG. 1.

In the power supply circuit shown in FIG. 1, when the field effect transistor 17 is ON, the circuit is as shown in FIG. 2, in which an electric current $i_1 = V_1/L_1 \times t$ that is determined by an input pulsating voltage $V_1$ of the positive electrode terminal and the negative electrode terminal of the rectifying circuit 12, and an inductance L1 of the choke coil 13, tends to flow when the field effect transistor 17 is turned on; and the electric current $i_1$ flows for a period of time in which the diode 15 is positively biased, while reducing an electromotive voltage $V_2$ of the auxiliary coil 14c of the converter transformer 14.

Therefore, in order to make the output direct-current voltage constant, the pulse width modulation control circuit 20 performs control so that an electric current corresponding to the input pulsating voltage flows in the field effect transistor 17 while fluctuating in the form of a sine wave.

In other words, an amount of the reverse bias of the auxiliary coil 14c by a magnetic flux of the converter transformer 14 is compensated. Thus, the input pulsating current can be detected and a fluctuation of the electric current in the field effect transistor 17 changes an energy stored in the choke coil 13.

Figure 3:
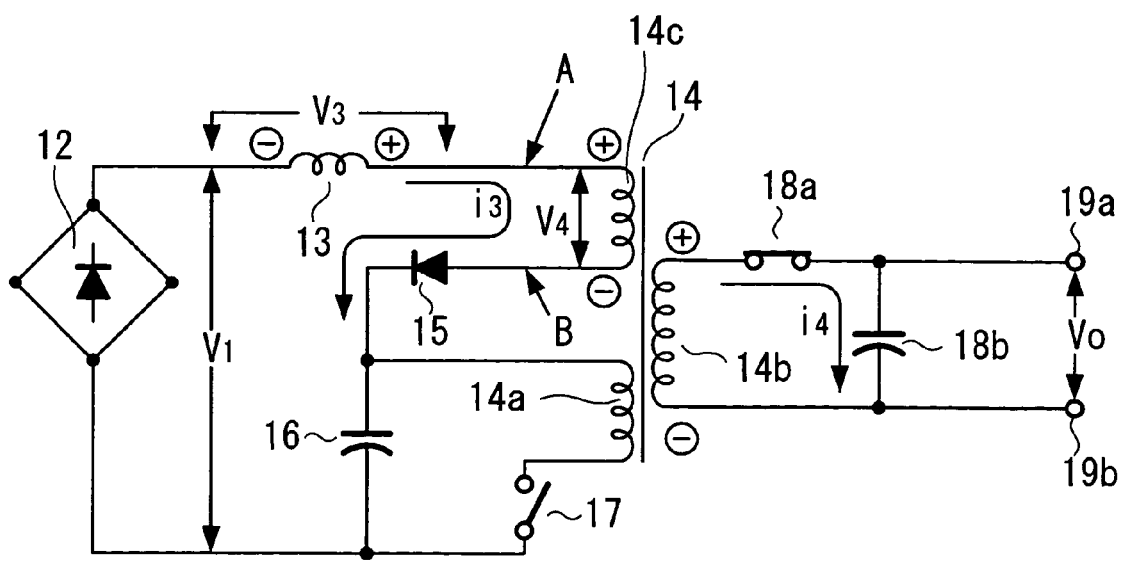
FIG. 3 is a circuit diagram provided for explaining FIG. 1.

Further, when the field effect transistor 17 is OFF, the circuit is as shown in FIG. 3, in which a counter-electromotive voltage $V_3$ of the choke coil 13 is superimposed on the input pulsating voltage $V_1$ when the field effect transistor 17 is turned off. Accordingly, an electric potential at a connecting point A between the choke coil 13 and the auxiliary coil 14c becomes a pulsating flow on which a switching potential corresponding to an amount of energy stored in the choke coil 13 at a time of turn-on is superimposed.

On the other hand, a counter-electromotive voltage $V_4$, which is generated at a time of turn-off, is generated in the auxiliary coil 14c of the converter transformer 14. The connecting point A has a reverse electric potential to the electric potential of the counter-electromotive voltage $V_4$, and an electric potential of a connecting point B between the auxiliary coil 14c and the diode 15 becomes an electric potential of a difference thereof.

In other words: when $V_1+V_3>V_4$, an electric current $i_3$ flows through the diode 15; and when $V_1+V_3<V_4$, the diode 15 is turned OFF and the electric current $i_3$ does not flow. This voltage $V_3$ is proportional to the electric current of the field effect transistor 17 at the time of turn-on, when the pulsating current is previously detected.

Since the power supply circuit of the present embodiment controls ON-OFF duty of the field effect transistor 17 and also the electromotive voltage $V_2$ of the auxiliary coil 14c at the time of ON and the counter-electromotive voltage $V_4$ of the auxiliary coil 14c at the time of OFF in addition to the counter-electromotive voltage $V_3$ of the choke coil 13 change in accordance with the input pulsating voltage $V_1$ and a load current $i_4$, it is easy to cope with the input pulsating voltage $V_1$ and a load fluctuation by setting a voltage of the auxiliary coil 14c.

As described above, the pulsating input current $i_1$ flows when the diode 15 is positively biased by the difference between the voltage of the auxiliary coil 14c of the converter transformer 14, and the counter-electromotive voltage $V_3$ of the choke coil 13 and the input pulsating voltage $V_1$; a waveform thereof becomes one which corresponds to the input voltage of the pulsating current; and a conduction angle is enlarged to become the form of a sine wave, so that a power factor can be improved.

Therefore, according to the power supply circuit of this embodiment, there is an advantage of the power factor being improved automatically by performing the control to obtain a constant output direct-current voltage $V_0$.

Further, according to this embodiment, since a power factor improving circuit is not particularly provided in comparison to conventional power supply circuits, efficiency is not lowered and a power supply circuit having high efficiency can be obtained, so that power saving can be realized.

Figure 5:
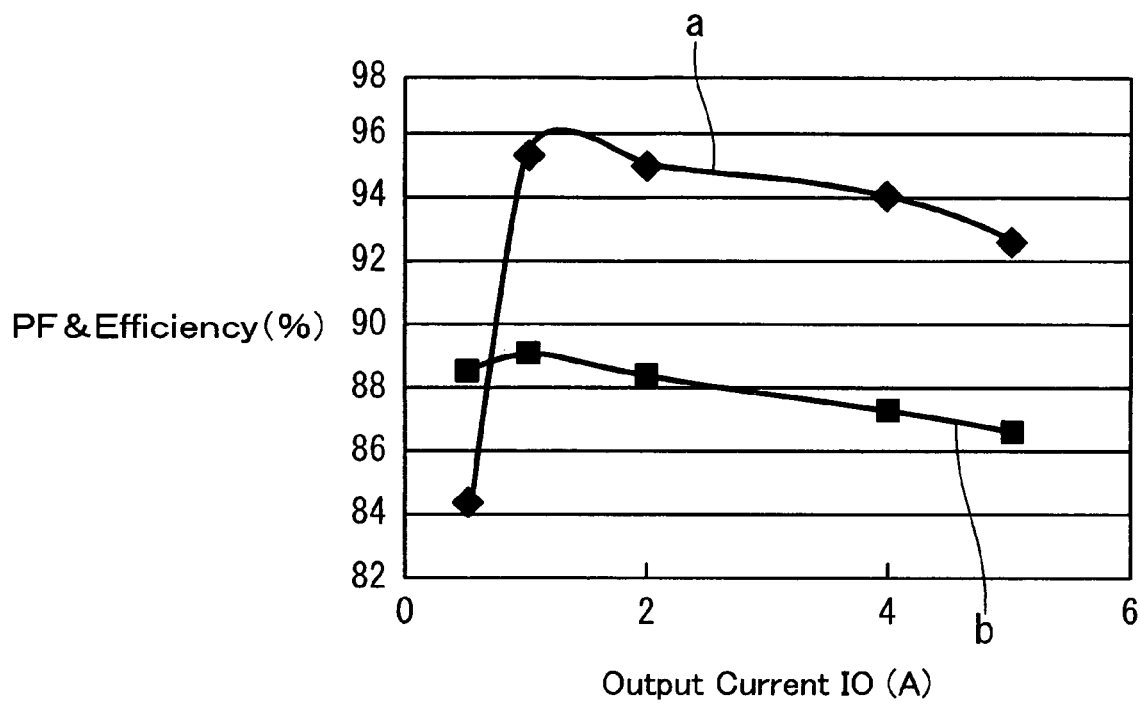
FIG. 5 is a graph provided for explaining the present invention.
Figure 6:
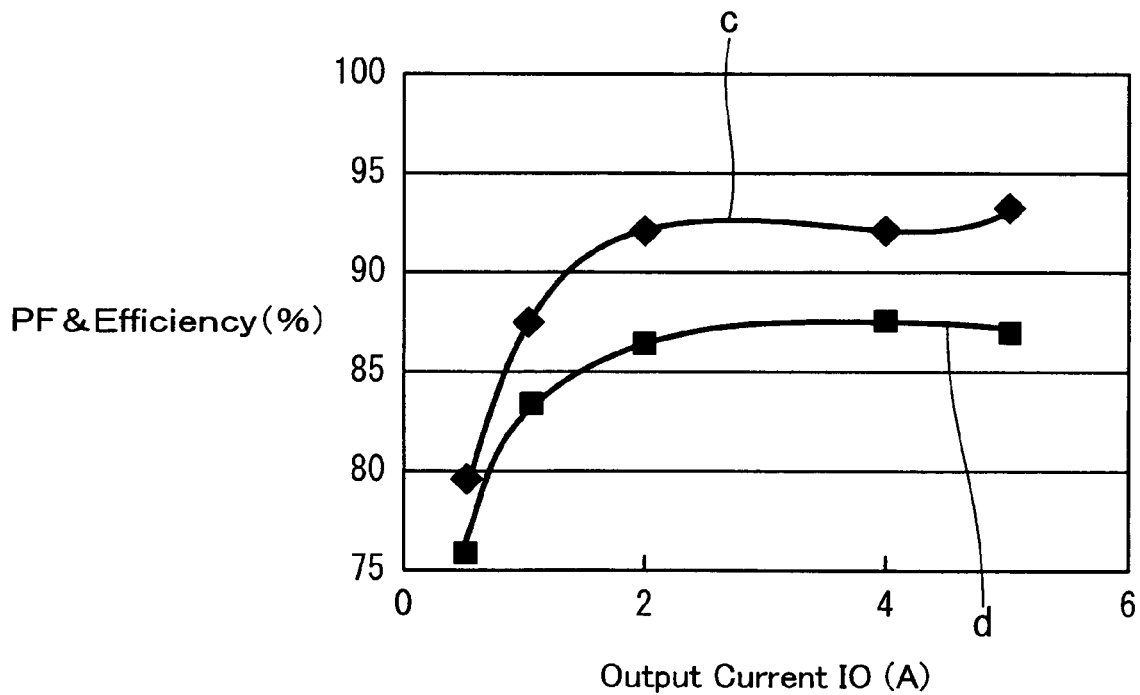
FIG. 6 is a graph provided for explaining the present invention.
Figure 7:
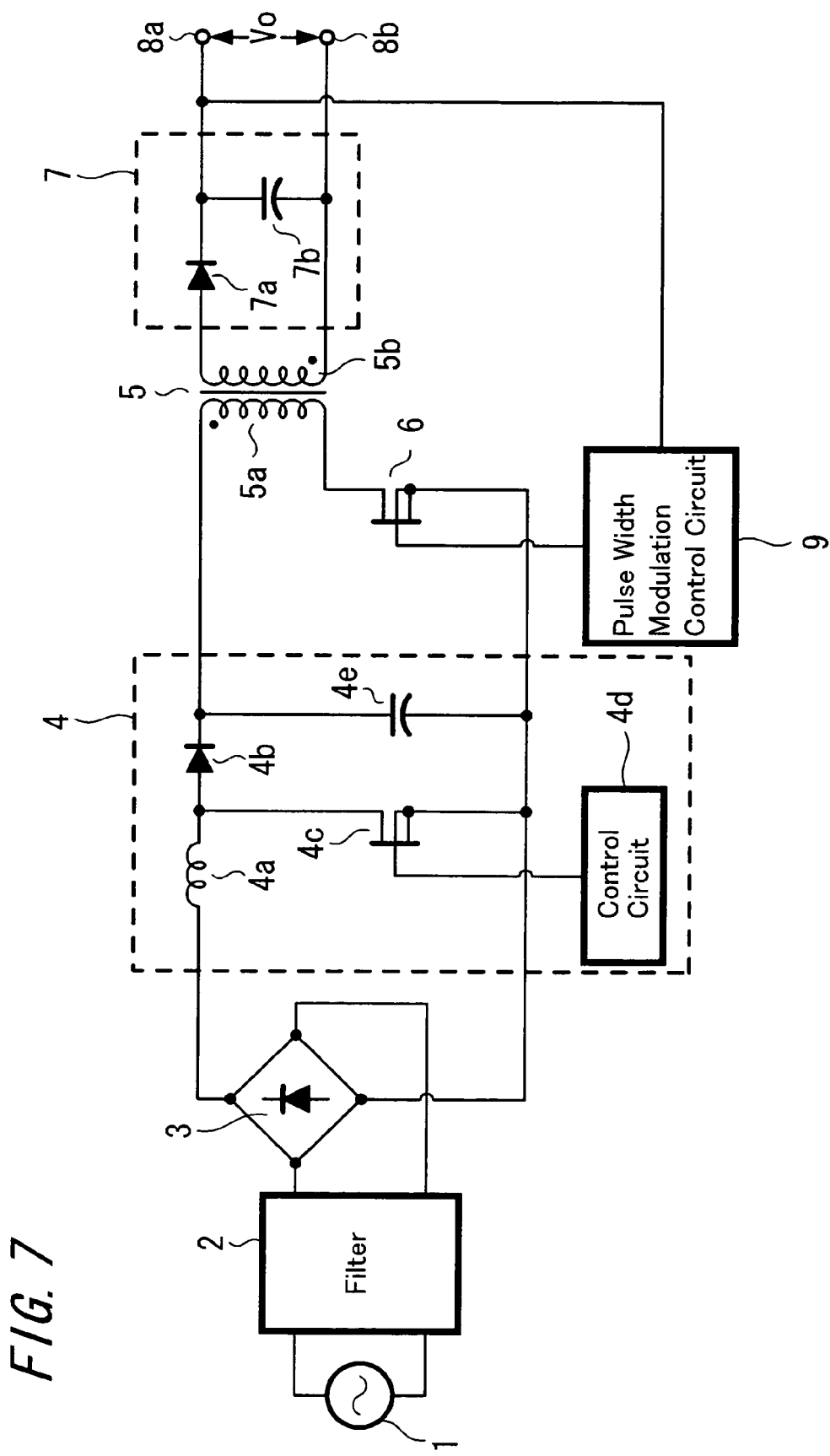
FIG. 7 is a constitutional diagram showing an example of a conventional power supply circuit.

In this connection, examples of the power factor and efficiency are shown in FIGS. 5 and 6, where power supply having AC 100v, 50 Hz and having AC 240v, 50 Hz are respectively provided as the commercial power supply 10 of this embodiment.

FIG. 5 shows a characteristic curve of the power factor a and a characteristic curve of the efficiency b for an example in which AC 100v, 50 Hz is provided as the commercial power supply 10. In this case, the power factor has been: 95.44% when an output current IO is 1 A; 94.97% at 2 A; 93.89% at 4 A; and 92.66% at 5 A. Also, the efficiency has been: 88.97% when the output current IO is 1 A; 88.4% at 2 A; 87.3% at 4 A; and 86.8% at 5 A.

FIG. 6 shows a characteristic curve of the power factor c and a characteristic curve of the efficiency d for an example in which AC 240v, 50 Hz is provided as the commercial power supply 10. In this case, the power factor has been: 87.05% when the output current IO is 1 A; 92.15% at 2 A; 92.21% at 4 A; and 93.12% at 5 A. Also, the efficiency has been: 83.26% when the output current IO is 1 A; 86.62% at 2 A; 87.75% at 4 A; and 87.55% at 5 A.

Figure 4:
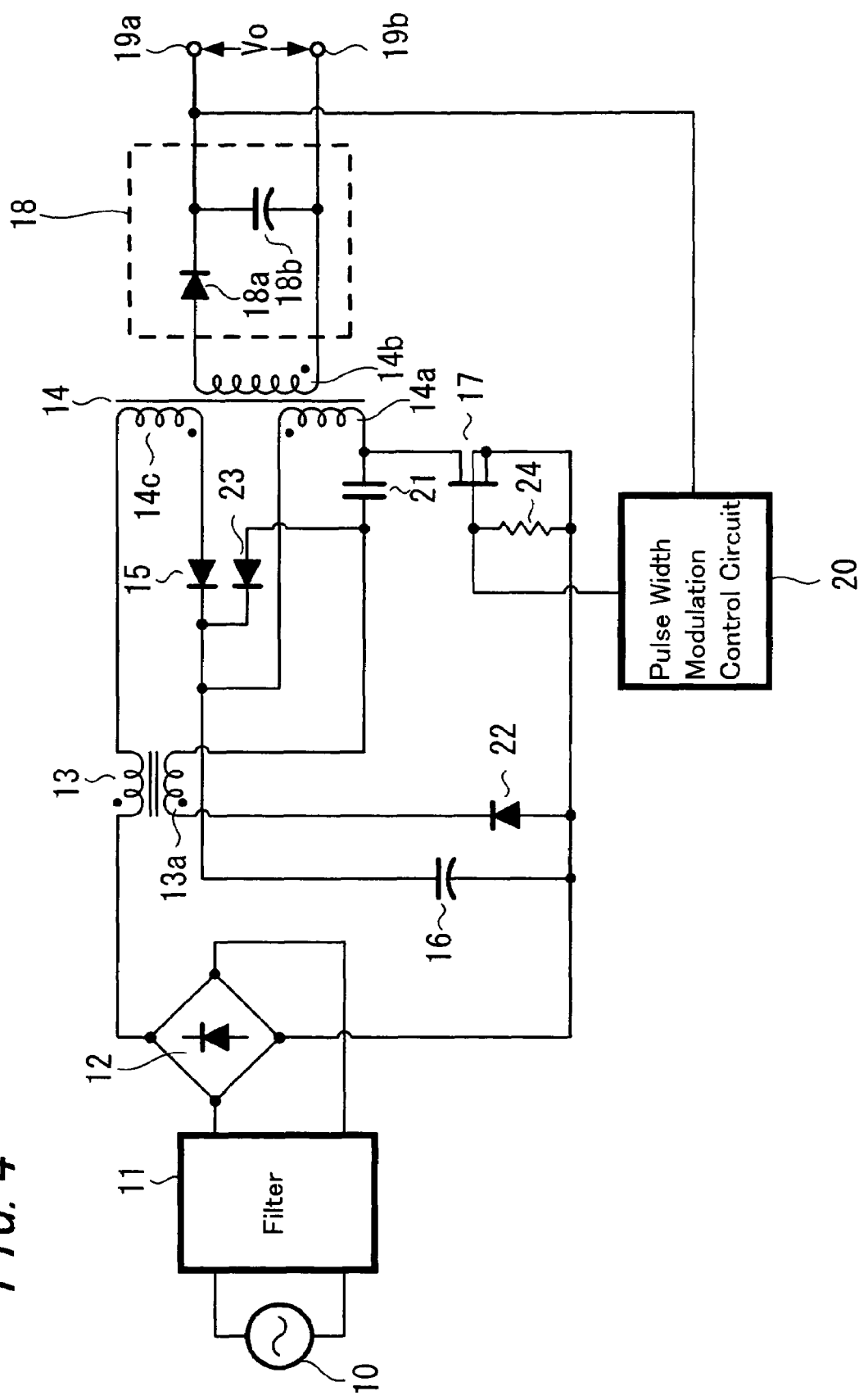
FIG. 4 is a constitutional diagram showing another embodiment according to the present invention.

FIG. 4 shows another embodiment according to the present invention. The embodiment shown in FIG. 4 is an example in which the example of FIG. 1 is further modified to attain higher efficiency. In order to explain the example shown in FIG. 4, the same reference numerals are given to those portions corresponding to FIG. 1 and a redundant explanation will be omitted.

In the example of FIG. 4, the positive electrode terminal on the output side of the rectifying circuit 12 is connected through the choke coil 13 to one end of the auxiliary coil 14c having a winding of a reverse phase to the primary coil 14a constituting the converter transformer 14; the other end of the auxiliary coil 14c is connected to the anode of the diode 15; the cathode of the diode 15 is connected to the positive electrode of the electrolytic capacitor 16 and the negative electrode of the electrolytic capacitor 16 is connected to the negative electrode terminal on the output side of the rectifying circuit 12.

A connection midpoint between the cathode of the diode 15 and the positive electrode of the electrolytic capacitor 16 is connected to one end of the primary coil 14a of the converter transformer 14; the other end of the primary coil 14a is connected to the drain of the field effect transistor 17 constituting the switching element; and the source of the field effect transistor 17 is connected to the negative electrode terminal of the rectifying circuit 12.

In the example of FIG. 4, a connection midpoint between the other end of the primary coil 14a and the drain of the field effect transistor 17 is connected through a capacitor 21 to one end of a second auxiliary coil 13a having a winding of the same phase as the choke coil 13; the other end of the second auxiliary coil 13a is connected to a cathode of a diode 22; and an anode of the diode 22 is connected to the negative electrode terminal of the rectifying circuit 12.

Further, a connection point of the capacitor 21 and one end of the second auxiliary coil 13a is connected to an anode of a diode 23; a cathode of the diode 23 is connected to the connection midpoint between the diode 15 and the electrolytic capacitor 16; and also the gate of the field effect transistor 17 is connected to the negative electrode terminal of the rectifying circuit 12 through a resistor 24. Other structure than the above remains the same as that of FIG. 1.

In such example of FIG. 4, the same operational effect as the example of FIG. 1 is obtained and further, when the field effect transistor 17 is OFF, an electric current generated by a counter-electromotive power of the primary coil 14a flows through the path of: the primary coil 14a→the capacitor 21→the diode 23→the electrolytic capacitor 16 to charge the capacitor 21, and rising of a voltage at a portion where a voltage and an electric current of the field effect transistor 17 are crossed is made slow, so that a switching loss of the field effect transistor 17 can be reduced. When the field effect transistor 17 is ON, an electric charge to the capacitor 21 flows through the path of: the capacitor 21→the field effect transistor 17→the diode 22→the second auxiliary coil 13a→the capacitor 21; the capacitor 21 is discharged to return to an initial state; and the switching loss at a time of next turn-off can be reduced.

Further, in this embodiment, such power supply circuits as that shown in FIGS. 1 and 4 are used for electronic equipment using comparatively large electric power of, for example, approximately 70 W or more. In this case, since this power supply circuit has high efficiency, it is possible to reduce power consumption of the electronic equipment.

As described above, according to the present invention, the pulsating input current flows when a diode is positively biased by a difference between a voltage of an auxiliary coil of a converter transformer, and a counter-electromotive voltage of a choke coil and an input voltage; and a waveform thereof becomes one corresponding to the pulsating input voltage, a conduction angle is enlarged to be the form of a sine wave, and a power factor can be improved automatically.

In other words, according to a power supply circuit of the present invention, when performing control to obtain a constant output direct-current voltage, there is obtained an advantage of the power factor being improved automatically.

Further, according to the present invention, since a power factor improving circuit is not particularly provided in comparison to conventional power supply circuits, a power supply circuit having high efficiency can be obtained without lowering the efficiency, so that power consumption can be reduced.

Moreover, in electronic equipment which uses the power supply circuit according to the present invention, since the power supply circuit has high efficiency, it is possible to reduce power consumption of the electronic equipment.

It should be noted that though an example using 100v, 50 Hz is explained as a commercial power supply in the above described example, it is obvious that other commercial power supply such as 90v to 264v, 50 Hz can also be used.

Furthermore, the present invention is not limited to the above described embodiments and needless to say various other structures could be adopted without departing from the spirit and scope of the present invention.

The invention claimed is:

1. A power supply circuit comprising:
   a direct-current power source from which a pulsating current is obtained;
   a choke coil connected to one terminal of said direct-current power source;
   a converter transformer having a primary coil, a secondary coil and a first auxiliary coil;
   a switching element which performs switching of an electric current of said converter transformer;
   a pulse width modulation control circuit which performs on-off control of said switching element;
   a first connection means for connecting the other end of said choke coil to one end of said first auxiliary coil of said converter transformer and for connecting the other end of said first auxiliary coil to the other terminal of said direct-current power source through a series circuit of a first diode and a first capacitor;
   a second connection means for connecting a connection midpoint between said first diode and first capacitor to one end of the primary coil of said converter transformer and for connecting the other end of said primary coil to the other terminal of said direct-current power source through the switching element;
   a third connection means for connecting the secondary coil of said converter transformer to a direct-current voltage output terminal through a rectifying circuit; and
   a fourth connection means for connecting said direct-current voltage output terminal to the input side of said pulse width modulation control circuit and for connecting an output terminal of the pulse width modulation control circuit to a control electrode of said switching element, wherein
   a connection point of said primary coil and switching element is connected to the connection point of said first diode and first capacitor through a series circuit of a second capacitor and a second diode, and
   a connection point of said second capacitor and second diode is connected to a connection point of said switching element and the other terminal of said direct-current power source through a series circuit of a second auxiliary coil having a winding of the same phase as said choke coil and a third diode.

2. Electronic equipment using a comparatively large electric power, comprising the power supply circuit according to claim 1.

* * * * *